United States Patent [19]

Weitemeyer et al.

[11] 4,311,821

[45] Jan. 19, 1982

[54] PROCESS FOR THE PREPARATION OF CROSSLINKED ORGANOPOLY-SILOXANES AND THEIR USE AS ACTIVE INGREDIENT OF ABHESIVE COATING MATERIALS FOR TWO-DIMENSIONAL CARRIERS

[75] Inventors: Christian Weitemeyer; Götz Koerner, both of Essen, Fed. Rep. of Germany

[73] Assignee: Th. Goldschmidt AG, Essen, Fed. Rep. of Germany

[21] Appl. No.: 142,838

[22] Filed: Apr. 22, 1980

[30] Foreign Application Priority Data

May 5, 1979 [DE] Fed. Rep. of Germany ........ 2918254

[51] Int. Cl.³ .............................................. C08G 77/06
[52] U.S. Cl. ..................... 528/15; 427/387; 427/391; 427/393.5; 428/447; 428/451; 428/452; 528/24; 528/31; 528/32
[58] Field of Search ...................... 528/15, 24, 31, 32; 427/387, 391, 393.5; 428/447, 451, 452

[56] References Cited

U.S. PATENT DOCUMENTS 4,079,037  3/1978  Frye et al. ............................. 528/32
4,248,750  2/1981  Marakumi et al. ..................... 528/31

Primary Examiner—Melvyn I. Marquis
Attorney, Agent, or Firm—Toren, McGeady & Stanger

[57] ABSTRACT

A process for producing crosslinked organopolysiloxanes by reacting organosilicon compounds, which have olefinic unsaturated groups, with organosilicon compounds which have SiH groups, in the presence of catalysts is disclosed. The compounds are useful as active ingredients of abhesive coating materials for two-dimensional carriers, especially paper and plastic film. Those organosilicon compounds with olefinic unsaturated groups contain, in the average molecule, at least one group of the formula

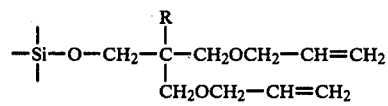

in which R is a methyl, ethyl, or —CH$_2$OCH$_2$—CH=CH$_2$ group. From the reaction of these compounds with organosilicon compounds which have SiH groups, siloxanes are obtained which have outstanding abhesive properties.

11 Claims, No Drawings

PROCESS FOR THE PREPARATION OF CROSSLINKED ORGANOPOLY-SILOXANES AND THEIR USE AS ACTIVE INGREDIENT OF ABHESIVE COATING MATERIALS FOR TWO-DIMENSIONAL CARRIERS

BACKGROUND OF THE INVENTION

1. Field of the Invention

The invention relates to a process for the preparation of crosslinked organopolysiloxanes by reacting organosilicon compounds which have olefinic unsaturated groups with organosilicon compounds which have SiH groups in the presence of catalysts and their use as active ingredient in abhesive coating materials for two-dimensional carriers, especially for paper and plastic films.

2. Description of the Prior Art

The preparation of crosslinkable organopolysiloxanes by reacting organopolysiloxanes, which have olefinic unsaturated groups, with polysiloxanes which have SiH groups, in the presence of catalysts and especially platinum catalysts is well known. Those reaction products in which the olefinic unsaturated hydrocarbon group, for example, the vinyl group, is linked over an SiC bond with the polysiloxane backbone, have proven to be particularly stable to hydrolysis. Such vinyl polysiloxanes are, however, very expensive to produce, because they must be synthesized by hydrolysis from halogen vinyl silanes, which themselves can be synthesized only with difficulty and are therefore expensive.

More easily accessible are those polysiloxanes with alkenyloxy groups, for example, allyloxy groups, which can be obtained by reacting chloropolysiloxanes and/or alkoxypolysiloxanes with allyl alcohol or derivatives of allyl alcohol. In so doing, products are obtained having, for example, structural units of the following formula:

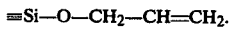

These compounds also may be reacted with polysiloxanes containing SiH groups in the presence of the conventional catalysts at elevated temperatures. This reaction is, however, disadvantageous in that the starting compounds which contain the alkenyloxy groups, as well as the crosslinked organopolysiloxanes, are relatively unstable to hydrolysis, as a result of the SiOC bond.

With this problem in mind, U.S. Pat. No. 4,079,037 discloses a method to improve the hydrolysis stability of alkenyloxy groups linked to silicon over oxygen by specific substitution, especially at the carbon atom which is next to the oxygen of the alkenyloxy group. As a result, the hydrogen atoms of the α-carbon atom of the alkenyloxy group are replaced totally or partially by hydrocarbon residues with 1 to 6 carbon atoms. At the same time admittedly, the hydrolysis stability of the alkenyloxy-substituted polysiloxanes increases. However, the reactivity of the correspondingly substituted derivatives of the allyl alcohol with halogen polysiloxanes decreases. Thus, as shown in Example 1 of U.S. Pat. No. 4,079,037, after a reaction time of 48 hours, only a 50% yield of alkenyloxy-substituted polysiloxane is obtained. Industrially, such a process is not economically feasible.

SUMMARY OF THE INVENTION

We have discovered a method for producing reactive crosslinked organopolysiloxanes by reacting organosilicon compounds A having aliphatic unsaturated groups with organopolysiloxanes containing SiH groups B and which, particularly in the crosslinked state, are stable to hydrolysis while at the same time, however, the starting compounds are readily available or can be prepared in a simple manner.

More particularly, this may be accomplished by using organosilicon compounds which contain in the average molecule, at least one group of the formula

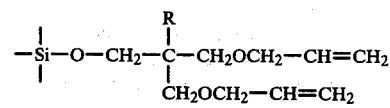

in which R is a methyl, ethyl or —CH$_2$OCH$_2$—CH═CH$_2$ group.

The inventive process accordingly is carried out with organosilicon compounds which have connected at one silicon atom, at least one trimethylolethanediallyl ether, trimethylolpropanediallyl ether, or pentaerythritoltriallyl ether group.

Linking of the trimethylolethanediallyl ether, the trimethylolpropanediallyl ether or the pentaerythritoltriallyl ether to the above molecule is readily accomplished by reacting for example the hydroxyl group with a Si halogen, Si amino, Si acyloxy or Si alkoxy group of an organosilane or organopolysiloxane.

Surprisingly, it turns out that the crosslinked organopolysiloxanes obtained by reacting the inventive organosilicon compounds with hydrogen polysiloxanes are stable to hydrolysis under normal conditions of use. It is not necessary to substitute the CH$_2$ group adjacent to the hydroxyl function of the allyl ether and it is therefore possible for the purpose of introducing allyl groups into organopolysiloxane compound A to use commercially available pentaerythritoltriallyl ether or the aforementioned diallyl ethers and to react these in practically quantitative yields with silanes or organopolysiloxanes which are reactive in respect to the hydroxyl groups of the ethers.

If such reaction products are used as organosilicon compounds A and allowed to react with the conventionally used organopolysiloxanes with SiH groups in the presence of catalysts, especially of platinum catalysts, at elevated temperatures, crosslinked hydrolysis-stable organopolysiloxanes are obtained in a simple and particularly economic manner.

DESCRIPTION OF THE PREFERRED EMBODIMENT

The use of organopolysiloxanes as the organosilicon compounds is particularly preferred. Because of their accessability, methylpolysiloxanes are especially preferred. At the same time, up to 10 mole percent of the methyl groups may be replaced by other alkyl and/or aryl groups.

Especially preferred are methylpolysiloxanes of the general formula

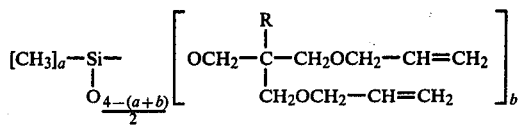

in which R has the aforementioned meaning,
a has a value of 1.8 to 2.2, and
b a value of 0.004 to 0.5.

Especially preferred are compounds in which "a" has a value of 2, the organopolysiloxane backbone is linear and, for example, the pentaerythritoltriallyl ether groups are terminal groups. Examples of suitable organosilicon compounds A are PTAOH = pentaerythritoltriallyl ether,
TMAOH = trimethylolethanediallyl ether,
TMPOH = trimethylolpropanediallyl ether, Si(—OPTA)$_4$;   CH$_3$—Si—(—OTMA)$_3$;

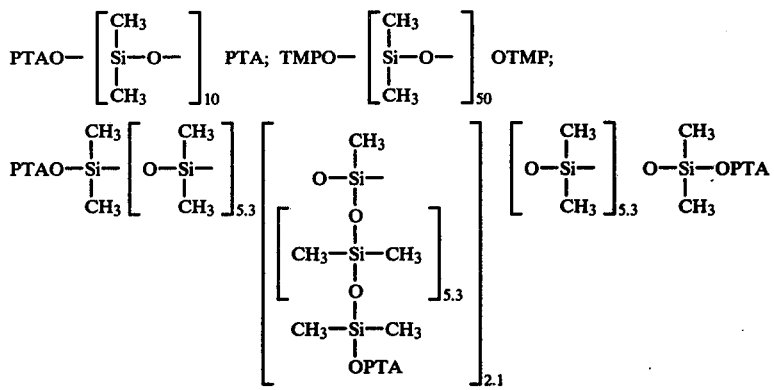

Known hydrogen polysiloxanes may be used as the organosilicon compounds B for the reaction with the organosilicon compounds A. These hydrogen polysiloxanes may be cyclic, linear or branched.

Examples of cyclic hydrogen polysiloxanes are

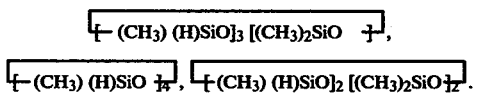

Examples of linear polysiloxanes are (H)(CH$_3$)$_2$Si-O[(CH$_3$)$_2$SiO]$_{1-20}$Si(CH$_3$)$_2$(H), (CH$_3$)$_3$SiO[(CH$_3$)(H)SiO]$_8$Si(CH$_3$)$_3$, (H)(CH$_3$)$_2$SiO[(CH$_3$)$_2$SiO]$_2$[(CH$_3$)(H)SiO]$_3$Si(CH$_3$)$_2$(H), or (CH$_3$)$_3$SiO[(CH$_3$)$_2$SiO]$_5$[(CH$_3$)(H)SiO]$_3$Si(CH$_3$)$_3$.

The hydrogen polysiloxanes may also consist of or contain trifunctional siloxy units. In place of the aforementioned methyl groups, there may also be alkyl groups with 2 and more carbon atoms, aryl or aralkyl groups. The hydrocarbon residues may optionally be substituted. Additional examples of suitable hydrogen polysiloxanes may be taken from the literature. By way of example, reference is made to U.S. Pat. No. 4,079,037, column 11, lines 32 to 43.

The organosilicon compounds A are reacted with the organosilicon compounds B in amounts relative to the olefinic double bonds and the SiH groups such that crosslinking is assured. In general, one olefinic double bond should correspond to one SiH group. It is a particular advantage of the inventively used organosilicon compound A that the content of SiH groups, based on the olefinic double bonds, can be reduced to a ratio of one SiH to ≦3 olefinic double bonds.

Suitable catalysts include those which catalyze the addition of SiH groups to olefinic unsaturated groups. Such catalysts are, for example, organic peroxides, such as, di-t-butyl peroxide or dicumene peroxide, as well as platinum-containing compounds, such as, chloroplatinic acid or platinum deposited on activated charcoal.

In order to obtain the desired crosslinked organopolysiloxanes, the organosilicon compounds A, the organosilicon compounds B and the catalysts are mixed together and heated, preferably at temperatures between 80° to 200° C. Fillers, pigments, softeners, solvents, anti-oxidants and inhibitors may additionally be added to the reaction batch.

The crosslinked organopolysiloxanes obtained are suitable as the active ingredient of abhesive coating materials for two-dimensional carriers, such as, paper and plastic film. Preferred are the organopolysiloxanes obtained by reaction with organopolysiloxanes of the formula

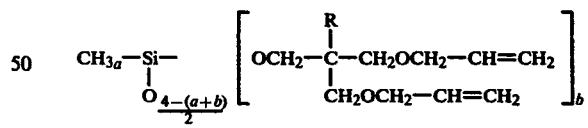

in which
a = 2 and
b = 0.1 to 0.025.

The crosslinked organopolysiloxanes may also be used as sealing materials for filing of electronic components and for the production of elastic or rigid molded articles.

The following examples illustrate the present invention:

EXAMPLE 1

A chlorosilane of the formula CH$_3$Si(Cl)$_3$ (149.5 g) is added within a period of 30 minutes and at room temperature to 758.5 g of pentaerythritoltriallyl ether (3 moles + 1% excess)

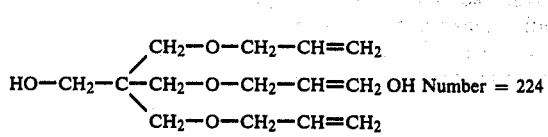
OH Number = 224 dissolved in 800 g of toluene. The temperature rises to 40° C. Subsequently, the mixture is cooled to room temperature and stirred for a further 30 minutes. After 3 hours, gaseous ammonia is passed into the solution at a rate of about 0.3 l/min. Precipitated ammonium chloride is filtered off and the filtrate is concentrated under vacuum at 100° C. A product (749.5 g) is obtained with a iodine number of 284.

This silane (10 g) is stirred well with 293.4 g of an SiH-containing siloxane of the formula

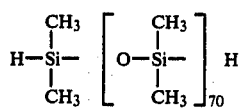

as well as with 16 mg of a platinum complex of the formula pyridine·C$_2$H$_4$·PtCl$_2$. The mixture so prepared has a viscosity of 98 cP and a pot life of 8 hours.

EXAMPLE 2

A chlorosiloxane (870 g) of the formula

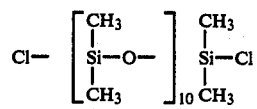

is added within a period of 30 minutes at room temperature to 505.8 g of pentaerythritoltriallyl ether (2 moles + 1% excess)

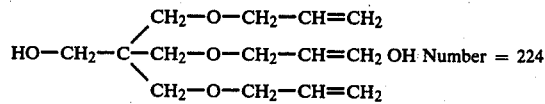
OH Number = 224 dissolved in 1200 g of toluene. Thereafter, stirring is continued for a further 30 minutes at room temperature. Gaseous ammonia is passed into the solution for 2 hours at a rate of approximately 0.3 l/minute. Precipitated ammonium chloride is filtered off and the filtrate concentrated under vacuum at 100° C. A product (1215 g) with an iodine number of 116 is obtained.

This siloxane (100 g) is well stirred with 42.86 g of an SiH-containing equilibrated siloxane mixture, which is obtained by the reaction between 2 parts by weight of octamethyltetrasiloxane and 1 part by weight of hydrogen siloxane having the approximate formula

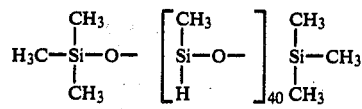

as well as with 7.6 mg of a platinum complex of formula pyridine·C$_2$H$_4$·PtCl$_2$. The mixture thus prepared has a viscosity of 95 cP and a pot life of more than 24 hours.

EXAMPLE 3

A chlorosiloxane (3759.9 g) having the formula

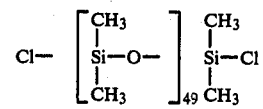

is added within 30 minutes at room temperature to 505.8 g of pentaerythritoltriallyl ether (2 moles + 1% excess)

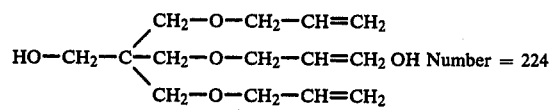
OH Number = 224 dissolved in 4000 g of toluene. Subsequently, stirring is continued for a further 30 minutes at room temperature. Gaseous ammonia is passed into the solution for 2 hours at a rate of about 0.3 l/minute. Precipitated ammonium chloride is filtered off and the filtrate is concentrated under vacuum at 100° C. A product (3893.8 g) with an iodine number of 35.5 is obtained.

This siloxane (100 g) is stirred well with 9.17 g of an SiH-containing siloxane of the formula

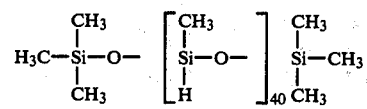

as well as with 5.8 mg of a platinum complex of the formula pyridine·C$_2$H$_4$·PtCl$_2$. The mixture thus prepared has a viscosity of 69 cP and a pot life of 20 hours.

EXAMPLE 4

A chlorosiloxane (2138.4 g) of the formula

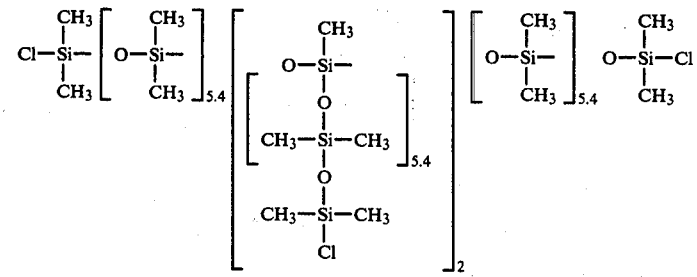

is added to 1010 g of pentaerythritoltriallyl ether (4 moles + 1% excess)

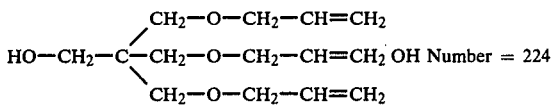 OH Number = 224 dissolved in 3000 g of toluene within 30 minutes at room temperature. Subsequently, stirring is continued at room temperature for 30 minutes. Gaseous ammonia is passed into the solution for 4 hours at a rate of about 0.3 l/min. Precipitated ammonium chloride is filtered off and the filtrate is concentrated under vacuum at 100° C. A product (2782.9 g) with an iodine number of 101.0 is obtained.

This siloxane (100 g) is stirred well with 37.3 g of an SiH-containing equilibrated siloxane mixture obtained by the reaction between 2 parts by weight octamethylcyclotetrasiloxane and 1 part by weight of hydrogen siloxane and which has the approximate formula

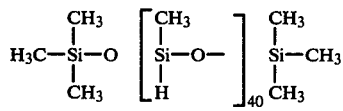

and with 7.3 mg of a platinum complex of the formula pyridine·C₂H₄·PtCl₂. The mixture thus prepared has a viscosity of 161 cP and a pot life of 8 hours.

EXAMPLE 5

A chlorosiloxane (6723.9 g) of the formula

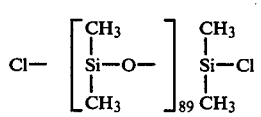

is added within 30 minutes at room temperature to 432.3 g of trimethylolpropanediallyl ether (2 moles+1% excess)

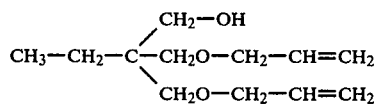

dissolved in 5000 g of toluene. Thereafter, stirring is continued at room temperature for 30 minutes. Gaseous ammonia is passed into the solution for 2 hours at a rate of about 0.3 l/minute. The precipitated ammonium chloride is filtered off and the filtrate is concentrated under vacuum at 100° C. A product (6658.0 g) with an iodine number of 13.8 is obtained.

This siloxane (100 g) is well stirred with 3.49 g of an SiH-containing siloxane of the formula

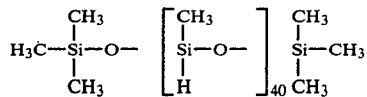

as well as with 5.5 mg of a platinum complex of the formula pyridine·C₂H₄·PtCl₂. The mixture thus prepared has a viscosity of 340 cP and a pot life of more than 24 hours.

EXAMPLE 6

A methoxysiloxane (2060.4 g) of the formula

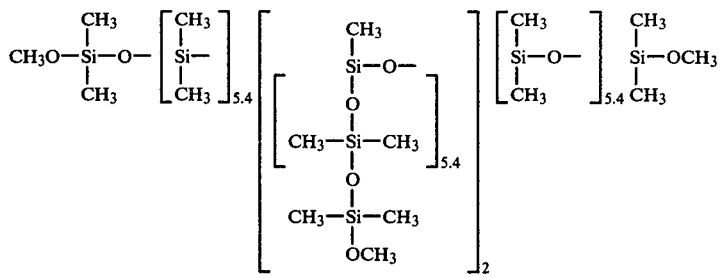

is added to 1010 g of pentaerythritoltriallyl ether (4 moles+1% excess)

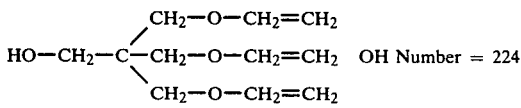 OH Number = 224 and 3 g of butyl titanate (0.1%) dissolved in 3000 g of toluene. Subsequently, the mixture is heated for 1 hour to 120° C. and the methanol, which is formed, is distilled off. The remaining solvent is then distilled off under vacuum up to a temperature of 100° C. A product (2736 g) with an iodine number of 102.8 is obtained.

This siloxane is well stirred with 1074.2 g of an SiH-containing siloxane of the formula

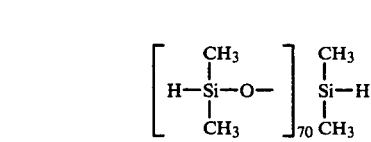

as well as with 62.4 mg of a platinum complex of the formula pyridine·C₂H₄·PtCl₂. The mixture thus prepared has a viscosity of 122 cP and a pot life of 8 hours.

EXAMPLE 7

Pentaerythritoltriallyl ether (990.81 g, 3.924 moles+1% excess)

$$HO-CH_2-C\begin{matrix}CH_2-O-CH_2=CH_2\\ CH_2-O-CH_2=CH_2\\ CH_2-O-CH_2=CH_2\end{matrix} \quad OH\ Number = 224$$

and 4.27 g of propargyl alcohol (0.076 moles, 0.2 weight percent based on the chlorosiloxane) are dissolved in 3000 g of toluene. Propargyl alcohol is used here as a setting inhibitor in order to avoid curing at room temperature. Within 30 minutes, 2138.4 g of a chlorosiloxane of the formula

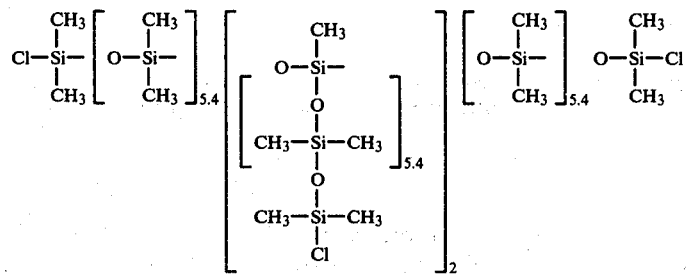

are added at room temperature. Stirring is subsequently continued for a further 30 minutes at room temperature. Gaseous ammonia is passed into the solution for 4 hours at a rate of about 0.3 l/minute. Precipitated ammonium chloride is filtered off and the filtrate is concentrated under vacuum at 100° C. A product (2768.6 g) with an iodine number of 101.5 is obtained.

This siloxane (100 g) is well stirred with 25.67 g of an SiH-containing siloxane of formula

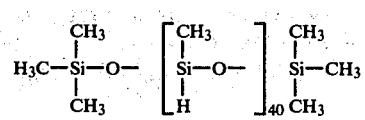

as well as with 6.7 mg of a platinum complex of the formula pyridine·$C_2H_4$·$PtCl_2$. The mixture thus prepared has a viscosity of 97 cP and a pot life of more than 24 hours.

USE TEST

The preparations of Examples 1 to 7 are applied with a 10µ doctor blade onto a yellow glassine paper (60 g/m²) at a level of about 8 g/m² and cured for 30 seconds at 130° C. in a circulating-air oven to form tack-free coatings. The following tests were carried out:
(a) release values at 20° to 70° C.,
(b) residual adhesive forces,
(c) abrasion strength,
(d) pot life.

(a) Determination of the Release Value

Self-adhesive tape, 3 cm wide, is rolled onto the coated paper. After being heated for 24 hours at 70° C. under a load of 20 p/cm² and cooled to 20° C., the adhesive is pulled off at an angle of 180 degrees and a rate of 60 cm/minute. The force, which is required for this pulling off and which is referred to as the release value in the following table, is measured. The test is also carried out at 20° C.

(b) Determination of the Residual Adhesive Force

The adhesive tape, pulled off as described in (a) above, is rolled out on a glass plate and placed under a load of 20 p/cm² for 24 hours at 20° C. and 70° C. The adhesive tape is then pulled off as described for the determination of the release values. The residual adhesive force, so obtained, is related to the adhesive force, which was determined in a blank experiment in which the adhesive tape was rolled out immediately on the glass plate (and not on the coated paper first). This blank result was given the value of 100%.

(c) Abrasion Strength

The paper was rubbed vigorously between the fingers.

(d) Pot Life

The viscosity was observed and the processability checked.

| Example | Release Value 20° C. | Release Value 70° C. | Residual Adhesive Force 20° C. % | Residual Adhesive Force 70° C. % | Pot Life | Abrasion Strength |
|---|---|---|---|---|---|---|
| 1 | 0 | 5 | 92 | 87 | >8 h | good |
| 2 | 0 | 5 | 88 | 82 | >8 h | good |
| 3 | 0 | 10 | 95 | 90 | >8 h | good |
| 4 | 5 | 5 | 89 | 84 | >8 h | good |
| 5 | 0 | 5 | 91 | 86 | >24 h | good |
| 6 | 0 | 5 | 92 | 87 | >8 h | good |
| 7 | 0 | 5 | 89 | 84 | >24 h | good |

What is claimed is:
1. In a process for the preparation of crosslinked organopolysiloxanes by the reaction of organosilicon compounds A, having olefinic unsaturated groups with organosilicon compounds B having SiH groups, in the presence of a catalyst, the improvement which comprises organosilicon compounds A having at least one group of the formula

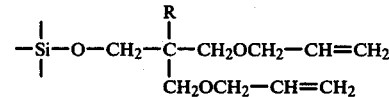

in the average molecule wherein R is methyl, ethyl or —$CH_2OCH_2$—CH=$CH_2$.

2. The process of claim 1 wherein organopolysiloxanes are used as organosilicon compound A.

3. The process of claim 1 or 2 wherein the organosilicon compound A is a methylpolysiloxane.

4. The process of claim 1 wherein the organosilicon compound A has the formula

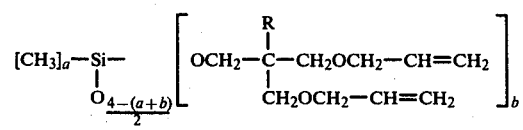

and a is 1.8 to 2.2, and
b is 0.004 to 0.5.

5. The process of claim 4 wherein a is 2.

6. The process of claim 1 wherein organosilicon compound A is

Si(—OPTA)$_4$; CH$_3$—Si—(—OTMA)$_3$;

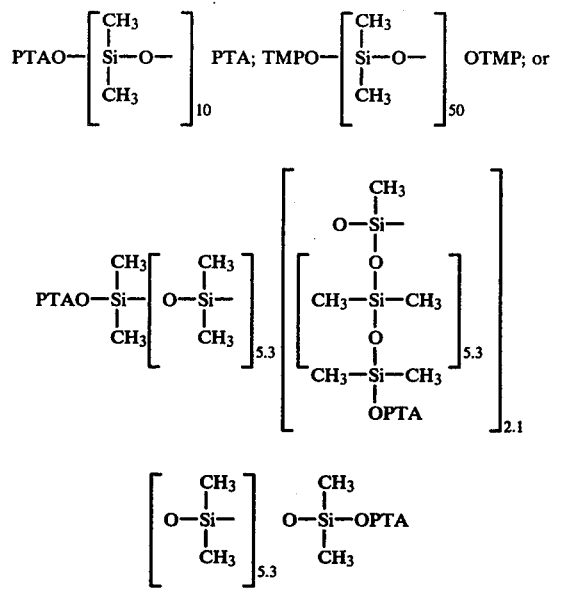

wherein

PTAO is derived from pentaerythritoltriallyl ether,
TMAO is derived from trimethylolethanediallyl ether and
TMPO is derived from trimethylolpropanediallyl ether.

7. The process of claim 1 wherein compound B is a hydrogen polysiloxane selected from the group consisting of

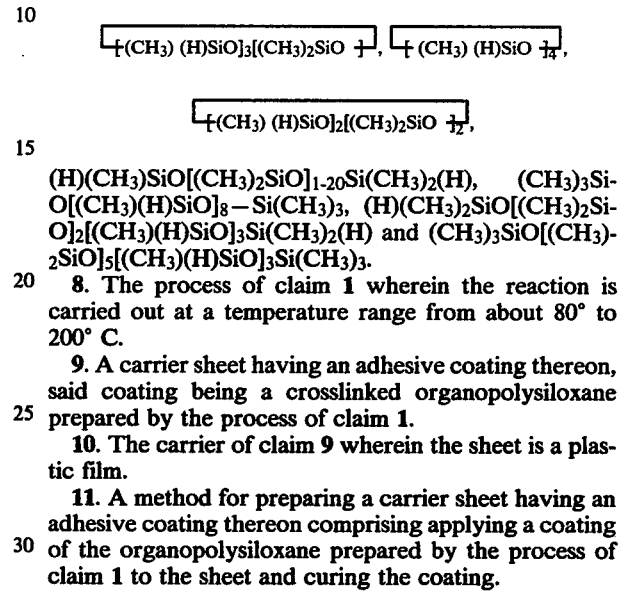

(H)(CH$_3$)SiO[(CH$_3$)$_2$SiO]$_{1-20}$Si(CH$_3$)$_2$(H), (CH$_3$)$_3$Si-O[(CH$_3$)(H)SiO]$_8$—Si(CH$_3$)$_3$, (H)(CH$_3$)$_2$SiO[(CH$_3$)$_2$Si-O]$_2$[(CH$_3$)(H)SiO]$_3$Si(CH$_3$)$_2$(H) and (CH$_3$)$_3$SiO[(CH$_3$)$_2$SiO]$_5$[(CH$_3$)(H)SiO]$_3$Si(CH$_3$)$_3$.

8. The process of claim 1 wherein the reaction is carried out at a temperature range from about 80° to 200° C.

9. A carrier sheet having an adhesive coating thereon, said coating being a crosslinked organopolysiloxane prepared by the process of claim 1.

10. The carrier of claim 9 wherein the sheet is a plastic film.

11. A method for preparing a carrier sheet having an adhesive coating thereon comprising applying a coating of the organopolysiloxane prepared by the process of claim 1 to the sheet and curing the coating.

* * * * *